Feb. 27, 1934.                A. BOUWERS                    1,949,348
                          ELECTRIC INSTALLATION
                       Filed Sept. 4, 1928    2 Sheets-Sheet 1

Inventor
Albert Bouwers

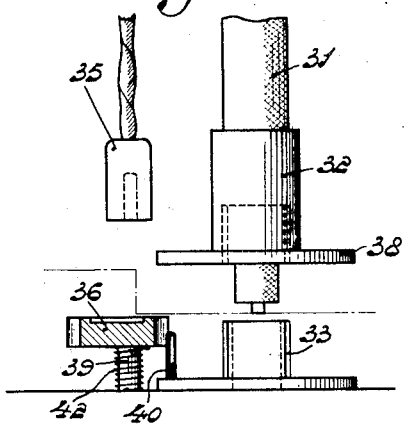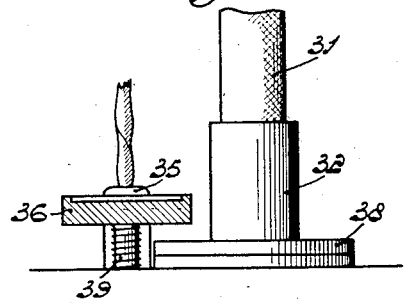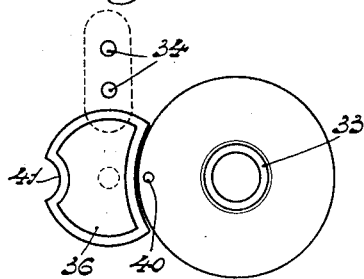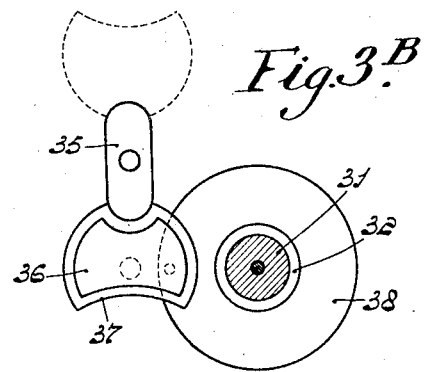

Patented Feb. 27, 1934

1,949,348

UNITED STATES PATENT OFFICE 1,949,348

ELECTRIC INSTALLATION

Albert Bouwers, Eindhoven, Netherlands, assignor to N. V. Philips' Gloeilampenfabrieken, Eindhoven, Netherlands, a limited-liability company of the Netherlands Application September 4, 1928, Serial No. 303,933
In the Netherlands February 25, 1928

10 Claims. (Cl. 250—34)

The invention relates to an electrical installation comprising an electrical high tension device with accessory connecting cables, and more particularly to an X-ray installation.

The invention has for its object to render it impossible for points of connection of the electrical high tension device to be put under tension when the connecting cables are not connected thereto.

An electrical installation according to the invention comprises a transformer having primary low tension and secondary high tension windings, a cable adapted to be connected to the secondary terminals of the transformer and a high tension protecting device, the latter comprising a circuit closer, designed to bridge an interruption in the primary circuit of the transformer, the closing of which is controlled by the terminal pieces with which the cable is connected to the transformer.

According to the invention by connecting and (or) securing one or more cables to the device one or more contacts are moved, while by these working contacts an interruption in the primary circuit may be suppressed.

The arrangement may be such that the connection of a cable to the secondary terminals of the transformer may be effected with the aid of a gland nut, the circuit closer bridging the gap by the insertion of the nut.

The invention is particularly important for installations which are to be operated by electrically unskilled persons such for example as X-ray installations. The X-ray tube as well as the cables, which extend between the tube and the transformer may be surrounded by a metal covering which may be maintained at a constant potential by a ground connection. Although it seems therefore that in this manner the X-ray installation should be entirely protected against high tension touch, it is still possible, in spite of the above described protection, to put the secondary connecting points of the transformer under tension before they are protected by securing the cables thereto. This danger has been removed by an X-ray installation according to the invention. An embodiment of the invention as applied to an X-ray installation is represented in the accompanying drawings.

Figure 1 is a section of part of a transformer while

Figs. 3A and 3B are top plan views of two positions of a constructional embodiment according to my invention;

Figs. 3C and 3D are elevations corresponding respectively to Figs. 3A and 3B.

Figure 1:
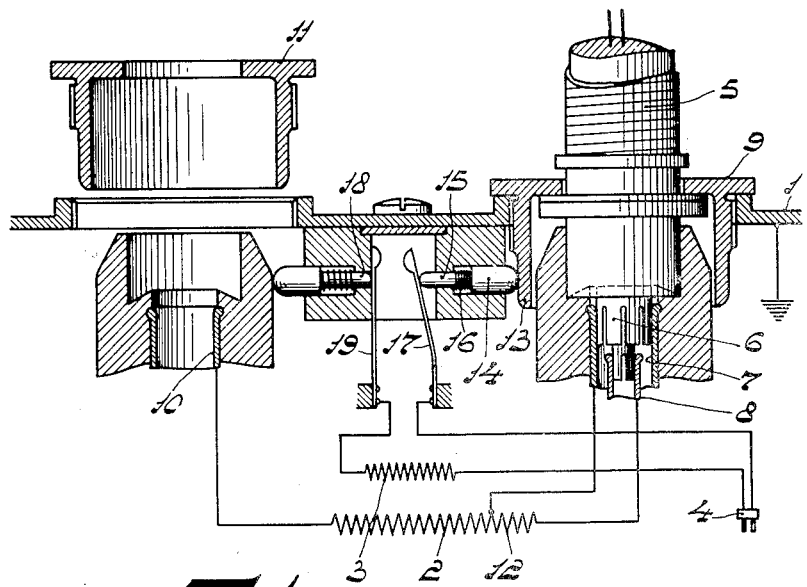

Referring to Figure 1, which only represents those members which are essential for the explanation of the invention, the numeral 1 denotes a part of the cover of a transformer shell. The windings of the transformer, which are destined to supply a high tension to an X-ray tube, are diagrammatically represented in the figure by 2 and 3. The device can be connected up to a source of current by means of a contact plug 4. A cable 5 having at its end a contact device 6 has two vanes which may be brought into connection with connecting points 7 and 8. The cable can be fixed to the device with the aid of a gland nut 9. Another cable, which is not represented in Figure 1, has one vane which may be connected to the point of connection 10. This cable may be connected to the device by means of a gland nut 11. The portion 12 of the secondary winding 2 located between the points of connection 7 and 8, serves to supply the heating current for the incandescent cathode of an X-ray tube.

Between the last-mentioned connecting points and the connecting point 10 a high-tension exists during operation which is necessary for the generation of the X-rays. When the nut 9 is screwed on, the rounded edge 13 engages a metal extension 14 which is secured to a pin 15. The latter may be made of metal but in that case it must be electrically insulated from the metallic extension 14. When the nut 9 is screwed on, the pin is displaced to the left against the action of a spring 16 and causes a contact spring 17 to move. When now with the aid of the nut 11 a second cable is secured in the same manner as the cable 5, a pin 18 is caused in an analogous manner to move to the right, said pin being quite similar to the pin 15. Owing to this, a contact spring 19 is forced to the right and an electrical connection between the contact springs 17 and 19 is established. When the contact plug 4 is connected up to a suitable source of alternating current, the current flows via the contact springs 19 and 17 to the primary winding of the transformer. However, as long as both nuts 9 and 11 are not screwed on, the feeding current for the transformer is prevented from flowing so that the secondary connection-points are not put under tension.

According to the invention the protection may also be obtained in another way, for example, owing to a switch included in the primary circuit, being locked by the pins 15 and 18 or by a similar device, so that this switch cannot be closed until the connecting cables are duly secured owing to which the locking is suppressed. Such an arrangement will be described hereafter with reference to Figures 3A–3D.

Figure 2:
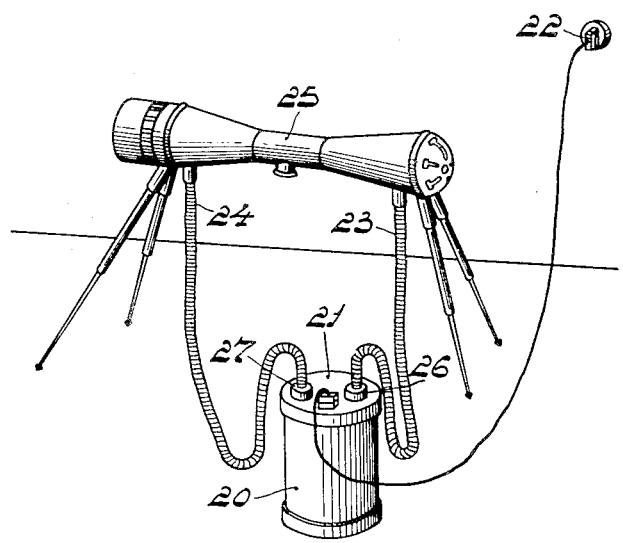
Figure 2 represents a complete X-ray installation to which the invention has been applied.

Referring to Figure 2, the numeral 20 denotes a transformer of which the cover 21 is partly shown in section as indicated by the numeral 1 in Figure 1. The primary winding of the transformer is connected by a flexible cord to a plug-in contact 22. Cables 23 and 24 lead from the secondary points of connection of the transformer respectively to the cathode and the anticathode of the X-ray tube 25 which is placed on a stand. With the aid of gland nuts 26 and 27 similar to those designated in Figure 1 by 9 and 11, the cables are secured to the transformer.

In Figs. 3A–3D the cable is denoted by 31. The end of the cable bears a gland nut 32, serving to secure the cable to socket 33. The primary winding of the transformer which is not shown in the drawing terminates in contact pins 34, which together with plug 35 form a circuit closer in the primary circuit of the transformer.

Plug 35 is prevented from being connected to pins 34 because of a safety interlock constituted by a disc 36, shown in section and as seen from above respectively. This disc is mounted on a spindle 39 and has a recess 37 for permitting the passage of the edge 38 of the gland nut.

On securing the terminal piece of the cable to socket 33 the edge 38 pushes a spring mounted pin 40. This pin normally forms an obstacle preventing turning of the disc 36, since it protrudes into the recess 37.

After the cable is suitably secured and the pin 40 removed thereby it is possible to turn disc 36 by hand and to bring it in the position of Figs. 3B and 3D. It then no longer prevents the insertion of plug 35, due to a recess 41 which is so formed that it permits the passage of the plug.

By such means it is impossible to close the primary circuit or to impress high tension on the secondary terminals of the transformer unless the latter are covered by the terminal contact pieces of the cables. On the other hand it is not possible to remove the cables without interrupting the primary circuit. Removal of the plug 35 will cause the disc to move back to the position of Figs. 3A and 3C under the influence of a helical spring 42.

The pin 40 may quite as well be connected to an arrangement for turning the disc 36, so that the latter takes the position B by only screwing-on gland nut 32. Arrangements for transferring the movement of pin 40 to that of disc 36, which are necessary for this variant, form a detail obvious to persons skilled in the art and require no further description.

A second disc similar to 36 indicated in dotted lines may be provided in connection with a second cable so as to obtain a complete protection.

It is evident that the invention is not limited to the exact construction shown and described and is also applicable to transformers designed for other than X-ray purposes.

What I claim is:

1. An installation comprising primary and secondary circuits, the primary circuit having a permanent break therein, a load, cables therefor, contacts connected to adjacent ends of the primary circuit defining the break and normally open but adapted to be closed to bridge the break, sockets adapted for connection to the cables and connected with the secondary circuit, gland nuts for connecting the cables with the sockets, and spring-biased pins for pushing the contacts into their closed position, the said pins being actuated by the gland nuts as an incident to the connection of the cables with the sockets.

2. An installation comprising primary and secondary circuits, the primary circuit having a permanent break therein, a load, cables therefor, contacts connected to adjacent ends of the primary circuit defining the break and normally open but adapted to be closed to bridge the break, sockets adapted for connection to the cables and connected with the secondary circuit, gland nuts for connecting the cables with the sockets, and having cam-shaped lower extremities, and spring-biased pins for pushing the contacts into their closed position, the said pins being pushed inwardly against the action of their biasing springs by the cam surfaces of the glands when the latter are actuated to connect the cables within the sockets.

3. An installation comprising a transformer casing, primary and secondary circuits therein, the primary circuit having a permanent break therein, a load, cables therefor, contacts connected to adjacent ends of the primary circuit defining the break and normally open but adapted to be closed to bridge the break, sockets mounted in the casing and adapted for connection to the cables and connected with the secondary circuit, gland nuts adapted to snugly engage the casing to connect the cables with the sockets, and spring-biased pins for pushing the contacts into their closed position, the said pins being actuated by the gland nuts as an incident to the connection of the cables with the sockets.

4. An electric installation comprising a transformer having primary low tension and secondary high tension windings, a high tension protective device, comprising a circuit closer and cables connected to the secondary terminals of the transformer, said primary of the transformer having a break therein, said cables being fixed to said terminals by the aid of gland nuts, the circuit closer being caused by the said gland nuts to bridge the break in the primary.

5. An X-ray installation comprising an X-ray tube, a transformer having a primary and a secondary winding and the primary winding having a circuit with a break therein, a high tension protective device, comprising a circuit closer and cables connecting the secondary winding of the transformer and the X-ray tube, gland nuts fixing said cables to the transformer, insertion of the gland nuts causing the circuit closer to bridge the break in the primary circuit.

6. An installation comprising a transforming device having a primary and a secondary, said primary normally being open, contact means adapted to close said primary, cables adapted to be connected with one of their ends to a load, sockets on said device and connected with said secondary, and means on the other ends of said cables for detachably connecting them in said sockets, closure of said primary by said contact means being possible only upon securing of said cables in said sockets by said securing means.

7. An installation comprising a transforming device, a primary and a secondary therefor, said primary being normally open, means for closing said primary, means for conducting electrical current from said secondary, and means for detachably securing said last-mentioned means to said secondary, said third-mentioned means, upon secural of said second-mentioned means, causing the actuation of said first-mentioned means for closing the primary.

8. An installation comprising a transforming device, a primary and a secondary therefor, said primary being normally open, means for closing said primary, means for conducting electrical current from said secondary, and means for detachably securing said last-mentioned means to said secondary, closure of said primary by said first-mentioned means being possible only upon securing of said second-mentioned means by said third-mentioned means.

9. An installation comprising a transforming device, a primary therefor, a secondary circuit, including an X-ray tube, said primary normally being open, contact means adapted to close said primary, cables forming part of said secondary circuit and connected with one of their ends to said X-ray tube, sockets on said device and connected in said secondary circuit, and means on the other ends of said cables for detachably connecting them in said sockets, closure of said primary by said contact means being possible only upon securing of said cables in said sockets by said securing means.

10. An installation comprising a transforming device, a primary and a secondary therefor, said primary being normally open, means for closing said primary, an X-ray tube, means for conducting electrical current from said secondary to said X-ray tube, said secondary, said X-ray tube, and said last-mentioned means comprising a secondary circuit, and means for detachably securing said last-mentioned means to said secondary, closure of said primary by said first-mentioned means being possible only upon securing of said second-mentioned means by said third-mentioned means.

ALBERT BOUWERS.